United States Patent Office 3,250,356
Patented May 10, 1966

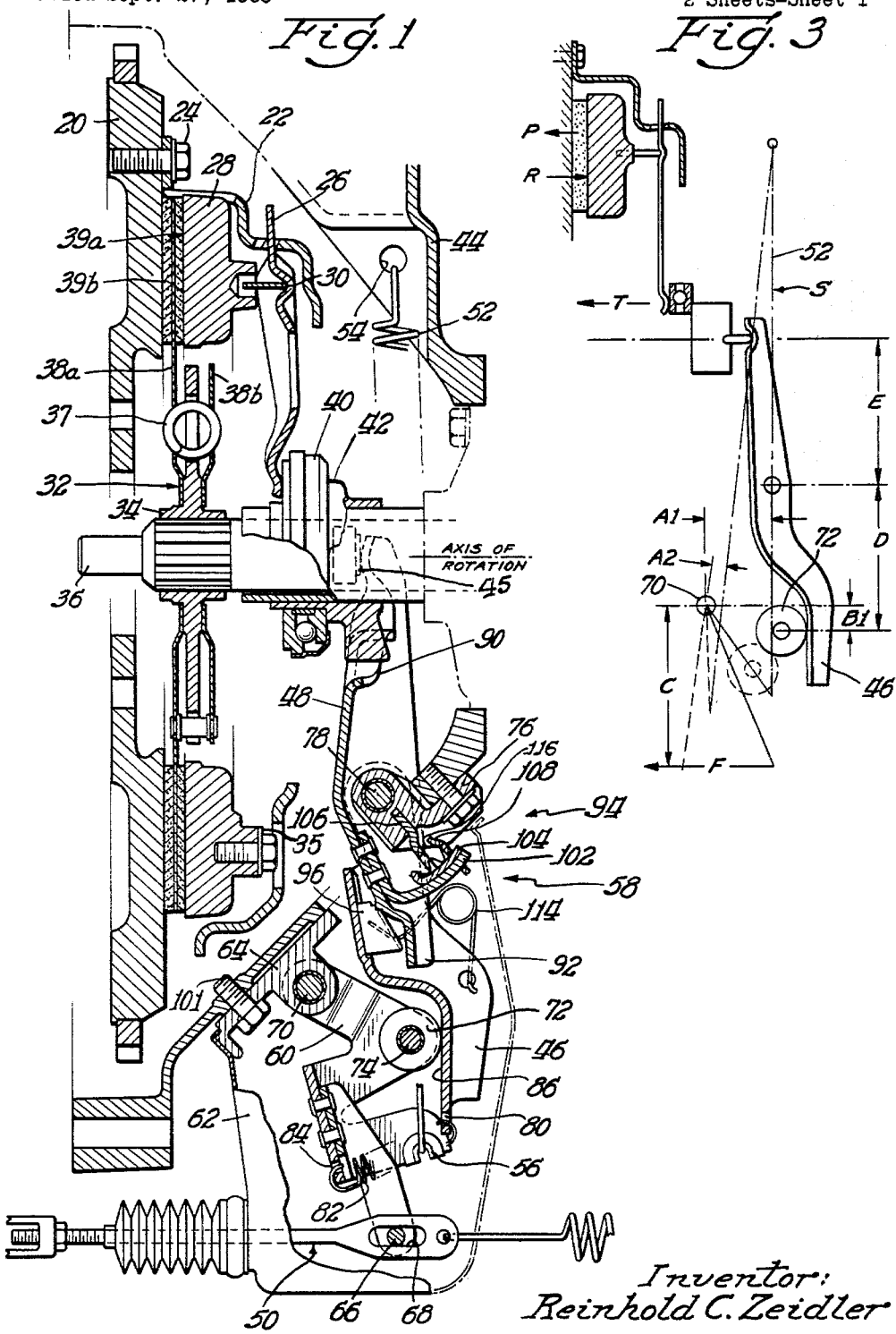

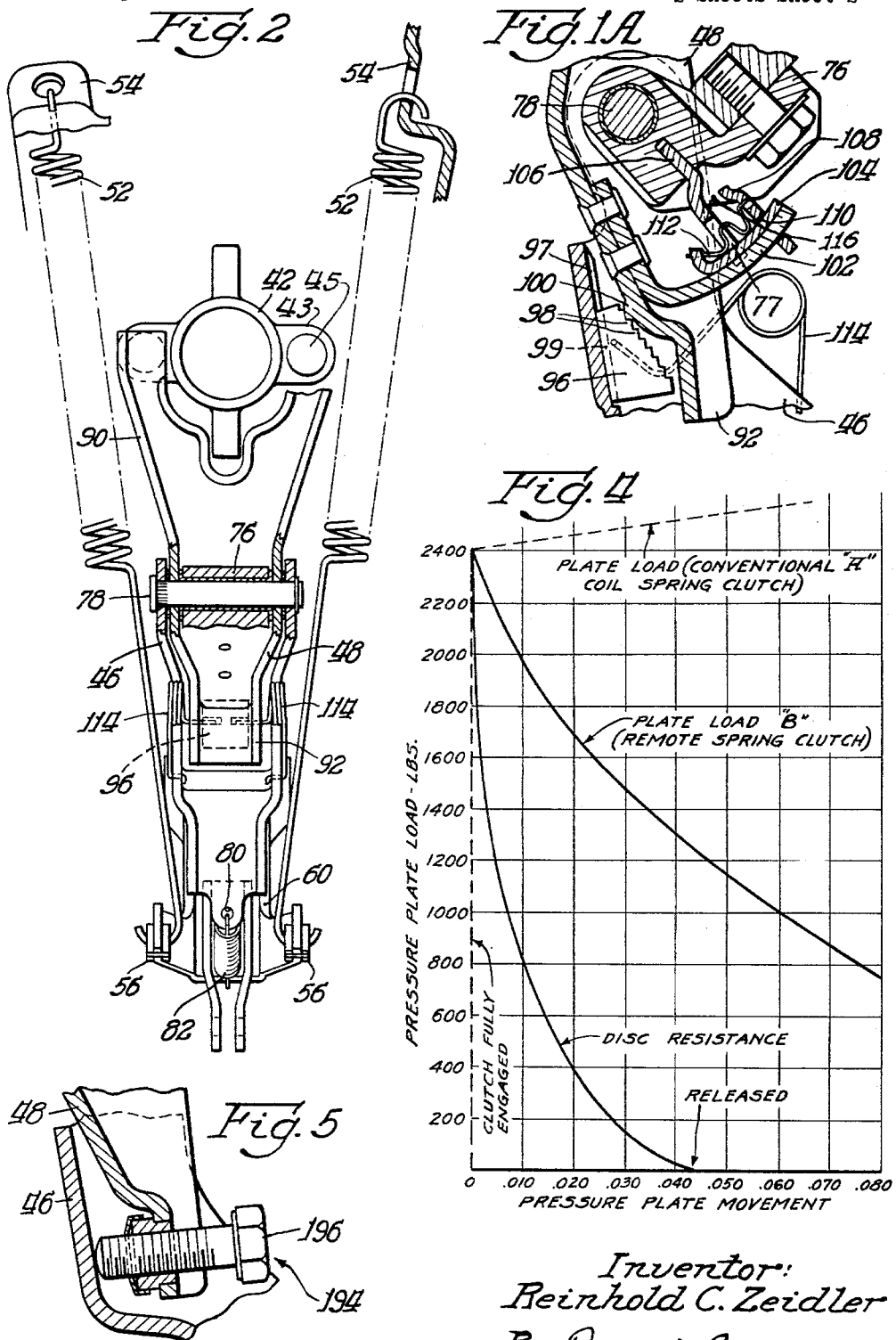

3,250,356
CONTROL FOR REMOTE SPRING TYPE CLUTCH
Reinhold C. Zeidler, Detroit, Mich., assignor to Borg-Warner Corporation, Chicago, Ill., a corporation of Illinois
Filed Sept. 27, 1963, Ser. No. 312,038
20 Claims. (Cl. 192—68)

This invention relates to a clutch and more particularly to a clutch suitable for use in automotive vehicles. It is characterized by being more compact than a conventional clutch and requiring much less pedal effort to operate.

A typical automotive clutch includes a cover plate, release levers, a pressure plate, load springs and a driven member. These clutch elements are fastened to the flywheel and are enclosed or partially enclosed in the bell housing. It is conventional practice to position the load springs between the cover plate and the pressure plate to provide a force to engage the clutch. The load spring means normally includes a plurality of springs arranged circumferentially around the clutch between the cover plate and the pressure plate. These springs normally extend parallel to the axis of rotation of the clutch.

The diameter as well as the axial dimension of a clutch assembly is normally a function of the horsepower that is to be transmitted by the clutch. Thus, as the horsepower of a vehicle increases, it is generally necessary to increase either the diameter of the clutch or the axial dimension of the clutch. It is, however, undesirable to increase either the diameter of the clutch or the axial dimension of the clutch because of space limitations in fitting the clutch into the vehicle.

Numerous attempts have been made to shorten the axial dimension of a clutch structure, one of which has been to position the load spring in a location wherein it does not add to the axial dimension of the clutch. This is accomplished by incorporating the load spring in the control linkage in a manner such that it does not occupy space between the pressure plate and the cover plate. With this type arrangement the load spring normally exerts a force on the pressure plate by way of the clutch bearing and the clutch levers. Examples of this type of clutch may be found in U.S. Patents 2,234,459, 2,234,460, 2,275,387, 2,275,388 and 2,300,187. This type clutch has been termed a "remote spring" clutch as it utilizes a load spring which is remote or outside the clutch cover plate. The load spring means of the prior art devices extends longitudinally substantially parallel to the axis of rotation of the clutch outside the bell housing adjacent the engine assembly or adjacent the transmission assembly. With this type of arrangement it is possible to reduce the axial dimension of the clutch assembly and consequently that of the bell housing as well.

However, with large engines, especially those of V-8 type, it is difficult to find room to locate the load spring outside the bell housing because of interference with elaborate exhaust systems, power steering, etc.

Briefly described, this invention relates to a remote spring type of clutch, that is, one wherein the load spring is incorporated in the control linkage and acts against the pressure plate by way of the clutch bearing and clutch levers. The clutch of the present invention differs, however, from prior art structures in that the load spring is positioned between the bell housing and the clutch assembly transverse the axis of rotation of the clutch. The bell housing which joins the transmission to the engine and encloses the clutch assembly is of necessity larger than the clutch assembly since it must also provide space for the clutch bearing, bearing sleeve and the fork lever. Because of the space needed for the latter items, sufficient space is automatically provided in nearly all bell housings to position the load spring transversely inside the housing.

The clutch itself being devoid of load springs can be made much more compact than a conventional spring loaded clutch and thus the bell housing can also be contoured to a smaller profile and a shorter axial dimension while still providing space for the load spring.

An important advantage of this remote spring clutch is the manner in which the load acts on the linkage which results in an over-center effect thus providing substantially lower pedal pressure. An additional advantage of this clutch over the prior art remote spring clutches is that the spring of this clutch and its associated linkage is enclosed within the housing and is protected from dirt and road splash.

Another substantial benefit from the subject invention is the provision of an automatic adjuster to compensate for lining wear. Conventional automotive clutches indicate the need for adjustment when the free play in the clutch pedal diminishes somewhat or disappears entirely. Most frequently it is the latter case and when this stage is reached, a clutch is quite likely to slip, overheat and become permanently damaged.

It is estimated that of the number of clutches replaced, approximately 50% are replaced as a result of failure to adjust the clutch pedal linkage as needed. The automatic adjuster of the present invention provides for adjustment of the clutch pedal linkage as a function of normal wear of the clutch. The automatic adjuster thus enables the clutch to wear normally while maintaining the clutch in proper adjustment and this results in a potential savings in clutch maintenance as well as clutch replacement expense.

A more complete understanding of the invention will be readily apparent to those skilled in the art from the specification and the drawing illustrating the certain preferred embodiment in which:

FIGURE 1 is a side view, partially in cross-section, of the clutch assembly;

FIGURE 1A is an enlarged view of the automatic adjuster;

FIGURE 2 is a partial view, partially in cross-section, of the transfer lever portion of the clutch assembly;

FIGURE 3 is a schematic representation of the mechanics of the clutch assembly;

FIGURE 4 is a displacement v. load plot of disc resistance and plate load with a clutch of the present invention as compared with a conventional coil spring clutch; and FIGURE 5 is a partial view of a manual adjustment means interposed between specific levers of the linkage system.

Referring now to the drawing, and more particularly FIGURE 1, the flywheel 20 is adapted to be driven by a power plant such as, for example, an internal combustion engine (not shown). The flywheel 20 carries a cover plate 22 which is mounted to the flywheel 20 in a conventional manner by bolts 24. The cover plate 22 carries clutch cover levers 26 which, in turn are connected to the pressure plate 28 by way of struts 30. A driven member 32 is positioned intermediate the pressure plate 28 and the flywheel 20. This driven member includes a hub portion 34 which is drivingly mounted on a driven shaft 36. The driven member 32 may include a vibration damper 37 interposed between the hub 34 and the clutch disc 38a and its associated washer 38b. The clutch disc 38a supports friction lining material 39a and 39b which friction lining material is interposed between the flywheel 20 and the pressure plate 28.

The pressure plate 28 and cover plate 22 are provided with flexible and resilient strap members or means 35 which are adapted to urge the pressure plate out of contact with the driven disc assembly. The flexible straps 35 are adapted to be maintained in a less flexed condition with the pressure plate member removed from the friction disc assembly. Thus, as the pressure plate is moved toward the driven plate assembly, the straps are substantially flexed and tend to urge the pressure plate back to its aforementioned condition. Straps for this purpose and of this general configuration are well-known elements of clutch assemblies; see, for example, United States Patent 3,167,163, Smirl et al., dated January 26, 1965.

The driven shaft 36 carries a clutch bearing 40 and a bearing sleeve 42 which are adapted to shift axially with respect to said driven shaft. Sleeve 42 includes bosses 43 to which are attached anti-friction buttons 45. The latter minimize friction between fork 48 and sleeve 42 upon actuation of the clutch. The bell housing 44 has mounted therein a transfer lever 46 and a fork lever 48. The fork lever 48 is adapted to actuate the bearing sleeve 42 which, in turn, actuates the clutch bearing 40 and the clutch cover levers 26. The fork lever 48 is shifted by the transfer lever 46 and the transfer lever 46 is shifted by the control lever 60 operated by pedal linkage 50.

The load spring means includes springs 52 which are mounted on opposite sides of the fork lever 48 and transfer lever 46 and extend transversely with respect to the clutch within the bell housing 44. The springs 52 are connected at one end thereof to aperture 54 of housing 44 and are connected at their opposite end to the load spring insulator 56 which forms a part of the control lever 60. These springs 52 extend in a direction transverse the axis of rotation of the clutch.

The clutch control linkage 58 includes a transfer lever 46, control lever 60 and fork lever 48 which are preferably mounted on housing 44. The housing may include a closure member 62 as illustrated in FIGURE 1.

The control lever 60 is mounted on the housing 44 by way of a control lever mounting bracket 64 and is connected to the rod 50 by a pin 66-slot 68 connection which affords a lost motion connection between the rod 50 and the control lever 60 for reasons which appear hereinbelow. The control lever 60 is adapted to pivot about a pivot point 70 on the control lever mounting bracket. The control lever 60 carries a control lever roller 72 which is rotatably supported on pin 74.

The transfer lever and fork lever are mounted on the housing 44 by way of the mounting bracket 76 and pivot about a pin 78. Mounting bracket 76 and control lever mounting bracket 64 are preferably formed as an integral unit and when so formed carry the clutch control linkage, i.e., the control lever, the roller, the transfer lever and fork lever as a package. This package can then be installed on the housing by means such as, for example, bolts 101. A spring 82 extends from an aperture 80 in the transfer lever 46 to an aperture 84 located in the control lever 60. This provides a resilient connection between the control lever and transfer lever and maintains the transfer lever in contact with the roller at all times. A roller surface 86 is provided on the transfer lever for engagement with the control lever roller 72.

The fork lever 48 includes a first end 90 which is adapted to engage the bearing sleeve 42 and a second end 92 which is connected to the transfer lever 46 by way of an automatic adjuster 94.

The automatic adjuster 94 includes a wedge 96 which is slidably guided on one end of the transfer lever 46 by way of groove 97 and tongue 99. Teeth 98 are formed on one side of wedge 96 and are adapted to be engaged by member 100 which forms a part of the fork lever 48. A release limiter guide 102 extends from the fork lever 48 and defines an arc about pin 78. A release limiter slide 104 is mounted on the release limiter guide 102 between the release limited guide 102 and the pin 78. A release limiter stop 106 extends from the mounting bracket 76 and includes a fork-shaped piece 77 which straddles the release limiter slide 104. A release limiter lockplate 108 has an aperture 110 which engages the release limiter slide 104 and the release limiter guide 102 such that in combination with the release limiter spring 112 it will permit one way motion between the release limiter slide 104 and release limiter guide 102 and will prevent motion therebetween in the opposite direction. A wedge spring 114 extends between the wedge 96 and the transfer lever 46.

The rim section of the clutch disc 38a is of a generally wavy configuration to provide resiliency between the friction linings 39a and 39b. This rim section is designed to be flattened under maximum applied load, i.e., at the time the clutch is fully engaged. The load springs, therefore, are designed to balance the resiliency of the rim section of the clutch disc in a manner such that the load spring is capable of substantially flattening the rim section during full engagement of the clutch. As the pressure plate is moved away from the flywheel thus initiating disengagement of the clutch, the rim section tends to assume its uncompressed shape and thus tends to separate the friction linings from each other. Patent 2,547,427 shows deflection characteristics for a disc of this type. The force exerted on the pressure plate due to the resiliency of the rim section is opposite the force exerted on the pressure plate by the load spring, see FIGURE 4. As a result, the force required at the pedal to move the pressure plate free of the friction lining is the difference between the load spring force effective at the plate and the rim section force. The force at the pedal in a conventional clutch increases substantially as the pressure plate moves in the releasing direction. It is, therefore, conventional practice to incorporate a powerful over-center spring in the clutch pedal linkage to reduce the pedal effort required to release the clutch.

With the apparatus of the present invention, the force at the pedal required to release the clutch is substantially reduced compared with a conventional clutch as indicated by the difference between curves A and B. This is illustrated in FIGURE 3, FIGURE 4, and TABLE I, wherein:

$A$ = Moment arm of load spring
$B$ = Moment arm of roller
$C$ = Moment arm of control lever
$D$ = Transfer lever
$E$ = Fork lever
$F$ = Force to release
$P$ = Plate load
$R$ = Reaction of the disc
$T$ = Thrust of the bearing
$S$ = Spring load
$MS$ = Moment of the load spring about 70

$MR$ = Moment of the disc about 70
$X$ = Change in length of load spring.

| Control lever position | Dimensions of— | | | | | Movement at— | | | |
|---|---|---|---|---|---|---|---|---|---|
| | A | B | C | D | E | Plate | Brg. | X | F |
| 0 Engaged | 1.665 | .790 | 3.750 | 3.700 | 3.745 | 0 | 0 | 0 | 0 |
| 1 | 1.5335 | .855 | 3.830 | 3.800 | 3.745 | .0097 | .062 | .100 | .250 |
| 2 | 1.400 | .921 | 3.900 | 3.895 | 3.742 | .019 | .125 | .200 | .500 |
| 3 | 1.265 | .987 | 3.945 | 3.985 | 3.740 | .029 | .187 | .285 | .755 |
| 4 | 1.125 | 1.053 | 3.975 | 4.070 | 3.740 | .039 | .250 | .360 | 1.010 |
| 5 | .985 | 1.119 | 3.990 | 4.155 | 3.737 | .049 | .312 | .425 | 1.270 |
| 6 | .840 | 1.185 | 3.990 | 4.225 | 3.737 | .058 | .375 | .485 | 1.530 |
| 7 | .690 | 1.250 | 3.970 | 4.295 | 3.735 | .068 | .437 | .535 | 1.785 |
| 8 Released | .540 | 1.315 | 3.935 | 4.355 | 3.735 | .078 | .500 | .375 | 2.040 |
| .010 Wear | 1.815 | .690 | 3.635 | 3.570 | 3.745 | .010 | .064 | −.135 | .265 |
| .020 Wear | 1.970 | .590 | 3.505 | 3.445 | 3.742 | .020 | .128 | −.280 | .540 |

| Control lever position | Forces | | | | | Moments | | |
|---|---|---|---|---|---|---|---|---|
| | P | R | T | S | F | MS | MR | MS−MR |
| 0 Engaged | 2,450 | 2,450 | 383 | 184 | 0 | 307 | 307 | 0 |
| 1 | 2,240 | 850 | 350 | 192 | 49.5 | 295 | 106 | 189 |
| 2 | 2,002 | 420 | 316 | 200 | 57.8 | 280 | 55 | 225 |
| 3 | 1,810 | 170 | 283 | 207 | 60. | 262 | 25 | 237 |
| 4 | 1,580 | 25 | 247 | 213 | 59.5 | 240 | 4 | 236 |
| 5 | 1,370 | 0 | 214 | 218 | 54. | 215 | 0 | 215 |
| 6 | 1,140 | | 179 | 223 | 47. | 187 | | 187 |
| 7 | 920 | | 144 | 227 | 39.6 | 157 | | 157 |
| 8 Released | 705 | | 110 | 230 | 31.5 | 124 | | 124 |
| .010 Wear | 2,780 | | 434 | 173 | | 314 | 307 | 7 |
| .020 Wear | 3,190 | | 500 | 162 | | 319 | 307 | 12 |

It will be noted from this table that as the clutch moves from position 0 (engaged) through eight increments to position 8 (released), the force exerted by the load spring increases from 184 pounds to 230 pounds which is an increase of about 25%. During this same period of time, however, the moment arm A through which the spring acts decreases from 1.665 inch to .540 inch which is a decrease of about 67%. Curve B shows clearly how the reduction in moment arm permits the load spring itself to function also as an over-center spring to effect a reduction in the applied plate load as the clutch is released. Maximum plate load is required only when the clutch is engaged.

Translating applied plate load and disc resistance into moments of force (MS) and (MR) respectively about point 70 it will be noted when the clutch is engaged the two moments are in equilibrium. This is indicated in FIGURE 4 where the two curves meet at 2400# and in TABLE I where MS and MR both equal 307 pounds inches in the engaged position.

As the control lever is moved toward position 8 it is seen from the curves and the table that MR diminishes more rapidly than MS. The difference MS−MR is the force the clutch pedal must overcome and is expressed under F as pounds at the end of the control lever. This is shown to have a maximum value of 60 pounds which is only about 25% of the load at the same point in a conventional clutch system. With this low control lever force and with a pedal having an initial ratio of 3 to 1 (clutch engaged) and a final ratio of 2 to 1 (clutch disengaged) the clutch of the present invention without a clutch pedal over-center spring exhibited much lower pedal loads than a conventional clutch with a clutch pedal over-center spring. TABLE II illustrates this comparison. This refers to a large high horsepower V-8 engine. Smaller popular size engines using this clutch would have pedal loads of only 15 to 20#.

Many cars are equipped with four-speed transmissions which require more operations of the clutch. With clutch pedal loads presently running between 30 and 50# it becomes most tiring to drive a car in heavy stop-start traffic. The subject clutch with its relatively light pedal load makes operation in heavy traffic seem almost effortless.

TABLE II

| Pedal travel (inches) | Conventional clutch | Remote spring clutch | | |
|---|---|---|---|---|
| | Pedal load (lbs.) with O.C. spring | Pedal load (lbs.) without O.C. spring | Pedal ratio | Control lever force (lbs.) |
| 0 | 0.0 | 0.0 | 3.0+ | 0 |
| 1 | 14.0 | 0.0 | 3.0 | 0 |
| 2 | 26.0 | 19.5 | 2.8 | 55 |
| 3 | 32.5 | 23.0 | 2.6 | 60 |
| 4 | 39.0 | 24.0 | 2.4 | 57 |
| 5 | 40.0 | 21.5 | 2.2 | 47 |
| 6 | 39.0 | 16.0 | 2.0 | 32 |

The automatic adjuster 94 is provided in the clutch linkage to re-position the clutch control lever 60 with respect to the control rod 50 upon a predetermined amount of wear of the lining material. As the friction linings 39a and 39b wear, the pressure plate 28, clutch cover levers 26, clutch bearing 40 and bearing sleeve 42 find new positions moving toward the left (FIGURE 1) (toward the flywheel) each time the clutch is engaged. This, of course, occurs in minute increments over thousands of miles of driving. As wear occurs, the fork lever 48 follows the movement of the bearing sleeve 42. The arcuate shaped limiter guide 102, which is attached to the fork 48, tends to move to the right as the fork lever 48 pivots about pin 78. The limiter slide 104, however, cannot move to the right due to the fact that the limiter stop 106 includes a fork which straddles the limiter slide to engage arms at the sides of the limiter slide 104 to limit movement thereof. Thus, as the wear occurs, the limiter guide 102 and the limiter slide 104 change positions relative to each other, i.e., the limiter slide 104 tends to move toward the fork lever 48. Each time the limiter slide 104 assumes a new position with respect to the limiter guide 102, the limiter lock plate frictionally locks these two members with respect to each other such that they will not reassume their previous positions.

Each time the clutch is released, the bearing sleeve 42 and the first end 90 of the fork 48 move to the right and the second end 92 of the fork lever 48 with the release limiter guide 102 and limiter slide 104 move to the left until the limiter lock plate 108 engages the limiter stop 106. At this particular time, the lock plate, the guide, the fork lever and the bearing sleeve are locked together such that further relative movement therebetween cannot occur. Thus, the fork can only move a fixed amount each time the clutch is disengaged. This amount is dependent on the clearance 116 between the lock plate 108 and the stop 106.

Drivers form a habit of depressing the clutch pedal consistently to a given point each time they release the clutch, regardless of the state of wear of the clutch linings, therefore the clutch pedal linkage 50, moves the same distance each time the clutch is released. As wear occurs the control lever 60 and pin 66 move in a counterclockwise direction, diminishing the lost motion between the linkage 50 and the lever 60. Thus, each time the clutch is released the lever 60 moves in a clockwise direction through a slightly greater angle. Since clockwise movement of fork 48 is limited to a fixed angle of movement by the lockplate limiter mechanism, a condition of overtravel develops between the transfer lever 46 and fork lever 48. When approximately .010 lining wear has occurred, the overtravel will be great enough to allow spring 114 to move the wedge 96 in one step toward pin 78. This restores the control lever 60 and the rod 50 to their original relative position to re-establish the original free play in the clutch pedal. This also re-establishes the original moment arm of the load spring and the plate load.

The steps in the wedge represent a preferred embodiment in that they permit adjustment to take place at predetermined increments of lining wear. The steps are preferably of a dimension such that each step represents an adjustment sufficient to compensate for approximately .010 inch of wear of the friction lining material.

With the improvement achieved by this clutch and more specifically the improvement in control lever force F mentioned hereinabove, it is possible to simplify the clutch pedal leverage system. For example the clutch pedal may be connected to the control lever by way of a light inexpensive cable operating over sheaves thus eliminating conventional equalizer shafts, rods, brackets and other expensive hardware. It is also possible to eliminate the conventional overcenter spring system. If, on the other hand, a light overcenter spring is added to the above mentioned system, it is possible to further reduce the pedal effort and the pedal stroke.

A manual adjuster 194 (FIGURE 5) may be used in lieu of the automatic adjuster 94. The manual adjuster 194 includes a bolt 196 which is threaded through fork lever 48 and engages transfer lever 46.

While this invention is described in connection with certain specific constructions and arrangements it is to be understood that this is by way of illustration and not by way of limitation and the scope of this invention is defined solely by the appended claims which should be construed as broadly as the prior art will permit.

I claim:
1. A cluth adapted to be positioned in a housing comprising a driving member and a driven member rotatably positioned within said housing adapted to rotate about an axis, a cover plate connected to said driving member spaced apart from said housing, lever means connected to said cover plate effective to provide for engagement and disengagement of said driving member with said driven member, and resilient means located within said housing between said housing and said cover plate and connected to said housing and operatively connected to said lever means effective to exert a force against said lever means.

2. A clutch adapted to be positioned in a housing comprising a driving member, a pressure plate and a driven member rotatably positioned within said housing adapted to rotate about an axis, a cover plate connected to said driving member spaced apart from said housing, lever means connected to said cover plate effective to provide for engagement and disengagement of said pressure plate with said driven member, resilient means located within said housing between said housing and said cover plate transverse said axis said first resilient means being connected to said housing and operatively connected to said lever means and effective to exert a force against said lever means and second resilient means connected to said cover plate and said pressure plate effective to urge said pressure plate out of engagement with said driven member.

3. A clutch adapted to be positioned in a housing comprising a driving member, a pressure plate and a driven member rotatably positioned within said housing adapted to rotate about an axis, a cover plate attached to said driving member interposed between said housing and said pressure plate, lever means connected to said cover plate effective to provide for movement of said pressure plate toward and away from said driving member, and resilient means being non-rotatively mounted within said housing and being located between said housing and said cover plate, said resilient means being effective to exert a force against said lever means to urge said pressure plate toward said driving member.

4. A clutch adapted to be positioned in a housing comprising a driving member, a pressure plate and a driven member rotatably positioned within said housing adapted to rotate about an axis, a cover plate interposed between said housing and said pressure plate, lever means connected to said cover plate effective to provide for movement of said pressure plate toward and away from said driving member, and resilient means non-rotatively mounted within said housing and located transverse said axis between said housing and said cover plate said resilient means being connected to said housing and operatively connected to said lever means and being effective to exert a force against said lever means to urge said pressure plate toward said driving member.

5. A clutch comprising a driving member, a pressure plate and a driven member interposed between said driving member and said pressure plate; a housing surrounding said driving member, said pressure plate and said driven member; a cover plate connected to said driving member surrounding said pressure plate and said driven member; a plurality of clutch cover levers operatively connected to said cover plate and said pressure plate; a fork lever pivotally connected to said housing and operatively connected to said clutch cover levers; a transfer lever pivotally connected to said housing and adjustably connected to said fork lever; means to actuate said transfer lever; resilient means connected to said housing and connected to said transfer effective to provide a clutch engaging force on said fork lever; and resilient means effective to urge said pressure plate away from engagement with said driven member.

6. A clutch comprising a driving member, a pressure plate and a driven member interposed between said driving member and said pressure plate; a housing surrounding said driving member, said pressure plate and said driven member; a cover plate connected to said driving member surrounding said pressure plate and said driven member; a plurality of clutch cover levers operatively connected to said cover plate and said pressure plate; a fork lever pivotally connected to said housing and operatively connected to said clutch cover levers; a transfer lever pivotally connected to said housing and adjustably connected to said fork lever; a control lever pivotally connected to said housing and slidably engaging said transfer lever; means to actuate said control lever; resilient means connected to said housing and said control lever effective to exert a clutch engaging force on said control lever; and resilient means connected to said pressure plate effective to exert a clutch disengaging force on said pressure plate.

7. A clutch comprising a driving member, a pressure plate and a driven member interposed between said driving member and said pressure plate; a housing surrounding said driving member, said pressure plate and said driven member; a cover plate connected to said driving member surrounding said pressure plate and said driven member defining a space between said cover plate and said housing; a plurality of clutch cover levers operatively connected to said cover plate and said pressure plate; a fork lever pivotally connected to said housing and operatively connected to said clutch cover levers; a transfer lever pivotally connected to said housing and adjustably connected to said fork lever; resilient means located within said space and connected to said housing effective to urge said fork lever in a direction to move said pressure plate toward said driving member; resilient means located within said cover plate connected between said pressure plate and said cover plate effective to urge said pressure plate away from engagement with said driven member; and means to actuate said transfer lever.

8. A clutch comprising a driving member, a pressure plate and a driven member interposed between said driving member and said pressure plate; a housing surrounding said driving member, said pressure plate and said driven member; a cover plate connected to said driving member surrounding said pressure plate and said driven member defining a space between said cover plate and said housing; a plurality of clutch cover levers operatively connected to said cover plate and said pressure plate; a fork lever pivotally connected to said housing and operatively connected to said clutch cover levers; a control lever connected to said housing in a manner to pivot about a point between an engaged position and a disengaged position; said control lever being operatively connected to said fork lever; a load spring positioned within said space connected to said housing and connected to said control lever defining a first moment arm about said point with said control lever in said engaged position and a second moment arm about said point with said control lever in said disengaged position; said first moment arm being in excess of said second moment arm; resilient strap interposed between said pressure plate and said cover plate to urge said pressure plate away from engagement with said driven member and means to actuate said control lever.

9. A clutch control linkage subassembly comprising a mounting bracket, a first pivot means located on said bracket, a second pivot means located on said bracket, a control lever pivotally positioned on said first pivot means, a roller rotatably supported on said control lever, a transfer lever pivotally mounted on said second pivot means adapted to engage said roller, a fork lever pivotally mounted on said second pivot means adapted to be actuated by said transfer lever and adapted to engage a clutch bearing, resilient means adapted to urge said fork lever in a first direction, and manual means adapted to urge said fork lever in a second direction.

10. A clutch control linkage comprising a clutch cover plate, a pressure plate, a plurality of clutch cover levers adapted to engage said cover plate, a clutch bearing, a control lever adapted to pivot about a first pivot point, a roller rotatably supported on said control lever, means connected to said bearing having a surface adapted to engage said roller and being adapted to pivot about a second pivot point, resilient means adapted to urge said control lever in a first direction, and manual means adapted to urge said control lever in a second direction.

11. A clutch control linkage comprising a plurality of clutch cover levers mounted between a cover plate and a pressure plate having an inner terminal end adapted to be engaged by a clutch bearing, a housing structure encompassing said clutch including a first pivot and a second pivot, a control lever pivotally mounted on said first pivot including a roller rotatably supported thereon, a transfer lever pivotally connected to said second pivot having a roller surface adapted to engage said roller, a release fork lever pivotally connected to said second pivot having a first end adapted to engage said bearing and having a second end adjustably connected to said transfer lever, resilient means connected to said control lever and connected to said housing adapted to urge said control lever in a first direction, resilient means connected to said pressure plate and said cover plate adapted to urge said control lever in a second direction, and manual means connected to said control lever adapted to urge said control lever in said second direction.

12. A clutch comprising a housing; a driving member; a driven member; a pressure plate adapted to urge said driven member into engagement with said driving member; a cover plate connected to said driving member surrounding said pressure plate and said driven member; a plurality of clutch cover levers mounted on said cover plate having means to engage said pressure plate and an inner terminal end adapted to engage a clutch bearing; a fork lever having a first end in engagement with said clutch bearing pivotally connected to said housing and having a second end; a transfer lever pivotally connected to said housing having a roller engaging surface thereon; a control lever pivotally connected to said housing having a roller rotatably supported thereon; means to urge said roller engaging surface into engagement with said roller; means connecting said transfer lever to said fork lever; resilient means adapted to urge said clutch bearing in a first direction; resilient means adapted to urge said clutch bearing in a second direction; and manual means adapted to urge said clutch release bearing in said second direction.

13. An automatic adjuster for a clutch linkage system comprising a control lever adapted to pivot about a first point; a clutch control rod; a roller rotatably mounted on said control lever; an end on said control lever adapted to engage said clutch control rod; a lost motion connection between said clutch control rod and said control lever; a transfer lever adapted to pivot about a second pivot point having a roller engaging surface thereon and a portion adapted to support a wedge; a fork lever pivotally mounted about said second pivot having a first end adapted to engage a clutch bearing, a limiter guide defining an arc about said second pivot point, and a surface adapted to engage a wedge; a wedge slidably positioned on said transfer lever adapted to engage said fork lever; resilient means adapted to shift said wedge with respect to said transfer lever; a limiter stop extending from said second pivot point toward said limiter guide; a limiter slide positioned on and carried by said release limiter guide having a portion adapted to engage said release limiter stop to limit movement of said fork with respect to said pivot; means to provide for one way relative movement between said limiter guide and said limiter slide; means to urge said transfer lever into engagement with said roller; resilient means to urge said control lever in a first direction; and manual means connected to said control lever by way of the lost motion connection effective to move said control lever in a second direction an amount sufficient to disengage said clutch.

14. A clutch comprising a driving member, a pressure plate, a driven member interposed between said driving member and said pressure plate, a cover plate connected to said driving member encompassing said driven member and said pressure plate, a clutch cover lever connected to said cover plate and said pressure plate having an inner end adapted to engage a clutch bearing; a clutch bearing slidably positioned to actuate said clutch cover lever; a housing surrounding said clutch including a first pivot point and a second pivot point; a control lever adapted to pivot about said first pivot point from an engaged position to a disengaged position; said control lever defining a first moment arm about said first pivot point when said clutch is engaged and defining a second moment arm of a length in excess of said first moment arm about said first pivot point when said clutch is disengaged; a lever in engagement with said clutch bearing and said control lever; resilient means connected to said control lever and said housing defining a third moment arm about said first pivot point when said clutch is engaged and a fourth moment arm of a length less than said third moment arm about said pivot point when said clutch is disengaged, resilient means connected to said pressure plate and said cover plate effective to urge said pressure plate away from engagement with said driven member and manual means to move said control lever from said engaged position to said disengaged position.

15. An adjustment mechanism for a clutch linkage system to compensate for wear of the friction lining material comprising a control rod, a control lever adapted to rotate about a first pivot point, a lost motion connection between said control rod and said control lever, a transfer lever adapted to pivot about a second pivot point driven by said control lever, a fork lever adapted to rotate about said second pivot point actuated by said transfer lever, an adjusting wedge interposed between said transfer lever and said fork lever, resilient means to shift said adjusting wedge with respect to said transfer lever, means to maintain said transfer lever in engagement with said control lever, means to urge said control lever in a first direction toward an engaged position, means to restrict the travel of said fork lever to a predetermined distance as a function of the engaged position of the pressure plate, and means to move said control lever a distance sufficient to move said transfer lever a distance at least as great as said predetermined distance.

16. A clutch control linkage subassembly comprising a mounting bracket, a first pivot means located on said bracket, a second pivot means located on said bracket, a control lever pivotally positioned on said first pivot means, a roller rotatably supported on said control lever, a transfer lever pivotally mounted on said second pivot means adapted to engage said roller, a fork lever pivotally mounted on said second pivot means adapted to be actuated by said transfer lever and adapted to engage a clutch bearing, means responsive to wear of the clutch friction lining material effective to change the relative position between said fork lever and said transfer lever, resilient means adapted to urge said fork lever in a first direction, resilient means adapted to urge said fork lever in a second direction and manual means adapted to urge said fork lever in said second direction.

17. A clutch control linkage comprising a clutch cover plate, a pressure plate, a plurality of clutch cover levers adapted to engage said cover plate, a clutch bearing, a control lever including a load transfer element pivoted about a first pivot point, first lever means contacting said clutch bearing pivoted about a second pivot point, second lever means contacting said load transfer element pivoted about said second pivot point, resilient means adapted to urge said control lever in a direction to cause engagement of said clutch, resilient means adapted to urge said control lever in a direction to cause dis-engagement of said clutch, manual means adapted to urge said control lever in a direction to disengage said clutch, and adjusting means to adjust the relative position of said clutch control lever and said clutch cover levers to compensate for wear of the clutch friction lining material.

18. An apparatus in accordance with claim 17 wherein said adjusting means is actuated by said clutch control linkage.

19. An apparatus in accordance with claim 18 wherein said adjusting means is actuated by said clutch control linkage in increments representing a predetermined quantity of wear of the clutch friction lining material.

20. An apparatus in accordance with claim 17 wherein said adjusting means is positioned between said first lever means and said second lever means.

References Cited by the Examiner
UNITED STATES PATENTS

| | | | |
|---|---|---|---|
| 1,927,643 | 9/1933 | Hughes | 192—99 |
| 2,248,378 | 7/1941 | Nutt | 192—68 |

DON A. WAITE, *Primary Examiner.*

DAVID J. WILLIAMOWSKY, *Examiner.*

ARTHUR T. McKEON, *Assistant Examiner.*